Craven & Clark,
Grain Drill.

No. 113,022. Patented Mar. 28, 1871.

Witnesses:
P. C. Dieterich
Wm. H. C. Smith

Inventor:
J. W. Craven.
A. Clark.
Per: Munn & Co.
Attorneys.

United States Patent Office.

JESSE W. CRAVEN AND ALBERT CLARK, OF CENTRE VALLEY, INDIANA.

Letters Patent No. 113,022, dated March 28, 1871.

IMPROVEMENT IN GRAIN-DRILLS.

The Schedule referred to in these Letters Patent and making part of the same.

*To all whom it may concern:*

Be it known that we, JESSE W. CRAVEN and ALBERT CLARK, of Centre Valley, in the county of Hendricks and State of Indiana, have invented a new and useful Improvement in Grain-Drills; and we do hereby declare that the following is a full, clear, and exact description thereof, which will enable others skilled in the art to make and use the same, reference being had to the accompanying drawing forming part of this specification.

My invention relates to grain-drills, and consists in certain improvements thereon, which will be hereinafter described and subsequently claimed.

Similar letters of reference indicate corresponding parts.

Figure 1:
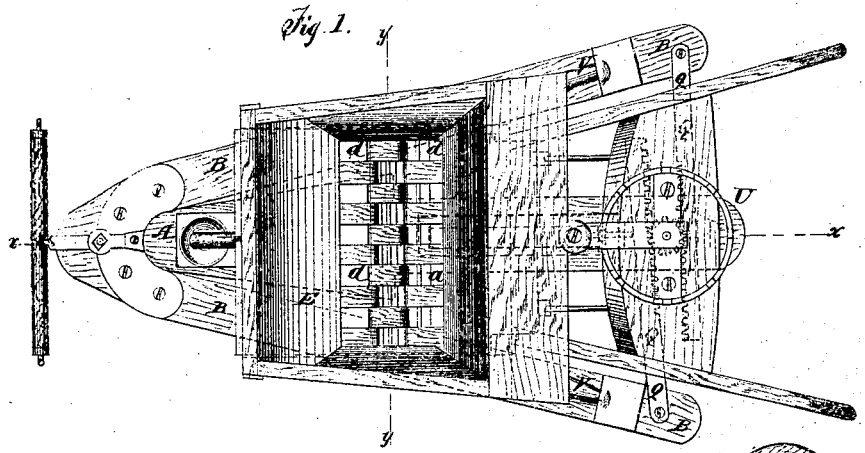
Figure 1 is a plan view of my improved machine.
Figure 2:
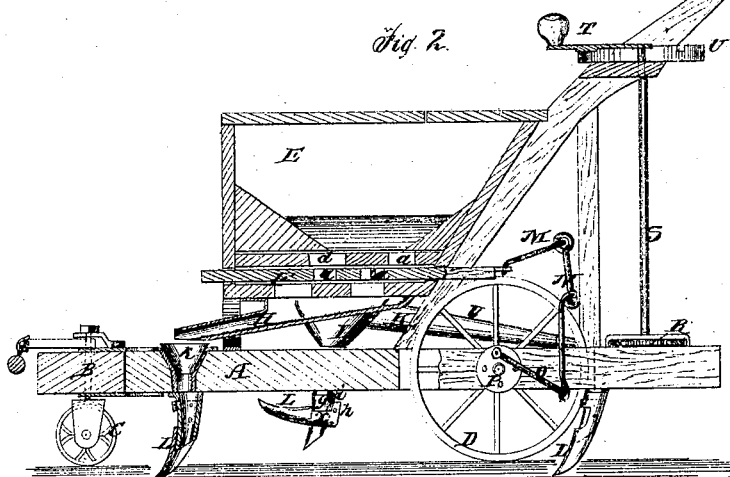
Figure 2 is a longitudinal section taken on the line $x\ x$ of fig. 1.
Figure 3:
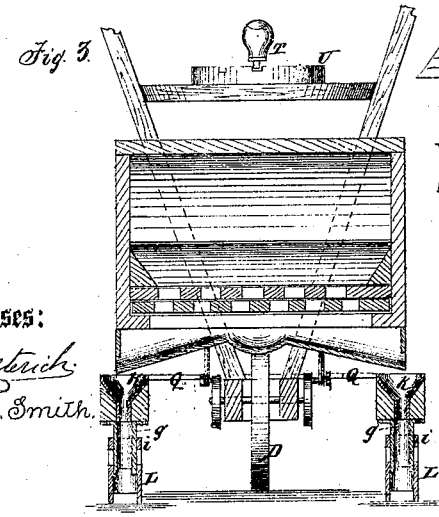
Figure 3 is a transverse section.
Figure 4:
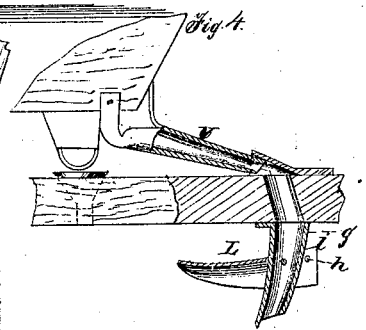
Figure 4 is a detail in section, showing the arrangement of the drills.

On a frame, consisting of the center-beam A and the beams B, jointed to A at the front, one on each side, and diverging therefrom in the manner of ordinary cultivators, which frame is mounted on a caster-wheel, C, and a slide-operating wheel, D, we mount the grain-hopper E, feed-slide F, spouts H I K, and the drills L, all as shown.

The feed-slide is connected by the rods M, lever N, and the rods O with the disks P on the axle of the wheel D, which disks have several holes, at different distances from the center, for the connection of the wrist-pin, which is properly constructed therefor, to vary the amount of movement of the slide, and thereby vary the dropping of the grain as may be required.

For insuring the feeding with regularity, we provide three rows or series of holes, $a\ b\ d$, in the bottom of the hopper, and the same in the feed-slide, the holes $a$ and $d$ being in the same longitudinal lines, and the holes $b$ being in the lines between $a$ and $d$, which gives two deliveries to each movement of the slide, and the feeding is very regular.

The spouts below the hopper-bottom are arranged relatively to the holes, so as to receive and convey to each drill a like quantity.

For spreading and contracting the frame the movable beams have each a toothed rack-bar, Q, pivoted to the rear end, and extending across the beam A, under suitable guides, and gearing with a pinion, R, on a shaft, S, which has a spring-crank, T, for turning and holding it at any point. It springs down into notches in the circular plate U, for holding it.

The drills L are pivoted at $f$ to the tubes $g$, and have notches in the front to admit of turning the points up from the ground, as indicated at $x$, and they are held in such position by the pins $h$ passing through the ears $i$ behind the tubes $g$.

The same pins, being passed through the ears at the front of the tubes, hold the drills in the working position.

The tubes leading to the drills at the center, between the ends of the beams B, are made in funnel shape at the top, as shown at K, to receive the grain in any position of the beams; and the rear tubes have spouts, $l$, which are pivoted at the upper ends, to oscillate with the beams.

Having thus described our invention,

We claim as new and desire to secure by Letters Patent—

1. The arrangement of the series of holes $a\ b\ d$ in the hopper bottom, and the corresponding holes in the slide.

2. The arrangement, with the dropping-slide and the driving-wheel, of the disks P, the rods M O, and the lever N, the said disks having two or more holes adapted to receive the wrist-pin at different distances from the axis, to vary the feed, all substantially as specified.

3. The arrangement of the drills L with the tubes $g$ and the pins $i$, for holding the said drills above the ground, all substantially as specified.

JESSE W. CRAVEN.
ALBERT CLARK.

Witnesses:
ALEX. CLARK,
WM. ALLEN.